Nov. 30, 1965 W. A. CAVAGNARO 3,220,736

STYLUS CAPTIVATOR FOR PHONOGRAPH CARTRIDGE

Filed April 16, 1963 3 Sheets-Sheet 1

INVENTOR.

WILLIAM A. CAVAGNARO,

BY Thomas A. Briody

HIS ATTORNEY.

STYLUS CAPTIVATOR FOR PHONOGRAPH CARTRIDGE

Filed April 16, 1963 3 Sheets-Sheet 2

INVENTOR.
WILLIAM A. CAVAGNARO,
BY Thomas A. Briody
HIS ATTORNEY.

STYLUS CAPTIVATOR FOR PHONOGRAPH CARTRIDGE

Filed April 16, 1963 3 Sheets-Sheet 3

INVENTOR.
WILLIAM A. CAVAGNARO,
BY Thomas A. Briody
HIS ATTORNEY.

United States Patent Office 3,220,736

Patented Nov. 30, 1965

3,220,736

STYLUS CAPTIVATOR FOR PHONOGRAPH CARTRIDGE

William A. Cavagnaro, Decatur, Ill., assignor to General Electric Company, a corporation of New York Filed Apr. 16, 1963, Ser. No. 273,468
9 Claims. (Cl. 274—25)

This invention relates to an improvement in phonograph pickup cartridges such as the type having a rotatable and removable stylus assembly therein, and more particularly to an improved arrangement for preventing inadvertent uncoupling or undesirable removal of a stylus assembly from a pickup cartridge.

An important object of my invention is to provide an improved phonograph cartridge which includes a novel arrangement for securing a stylus assembly thereto for preventing undesirable uncoupling or removal of the stylus assembly.

Another object of my invention is to provide a phonograph cartridge wherein a single member of novel structure and arrangement cooperates with the cartridge housing to effectively captivate a stylus assembly therein.

A further object of my invention is to provide a phonograph cartridge wherein a single member is constructed and arranged to effectively guard a drive rod of a stylus assembly and to securely captivate a stylus assembly in the cartridge housing.

A still further object of my invention is to provide an improved phonograph cartridge which is sturdy, efficient, economical to manufacture and dependable.

In accordance with my invention, in one form thereof, there is provided a phonograph pickup cartridge having a housing containing one or more transducer elements. On its underside, the housing has a removable and rotatably supported stylus assembly including a drive rod. The drive rod is mechanically coupled to the transducer elements by means of a coupler. A substantially U-shaped clip member removably cooperates with the housing of the cartridge to prevent uncoupling or removal of the stylus assembly therefrom. This clip member includes a pair of arms which snap into engagement with opposed sides of the housing, and a connecting portion which extends underneath a section of the drive rod. The connecting portion includes a tapered arch which underlies the drive rod and a pair of tabs which extend into the cartridge housing and cooperate therewith. When the U-shaped clip is snapped into engagement with the cartridge housing, the connecting portion captivates the drive rod of the stylus assembly and the tapered arch is arranged to serve as a protective guard for the drive rod while at the same time allowing clearance for its normal usage. The tabs on the connecting portion cooperate with the cartridge housing to help positively position the clip with respect thereto and assure secure engagement of the clip with the housing. These tabs also may be arranged to help control and limit lateral movement of the drive rod in the coupler. With such a structure and arrangement of the clip member in the cartridge, an efficient and simplified means is provided for captivating the stylus assembly while at the same time guarding and protecting the drive rod thereof.

Further aspects of my invention will become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawings, in which:

Figures 1, 2:
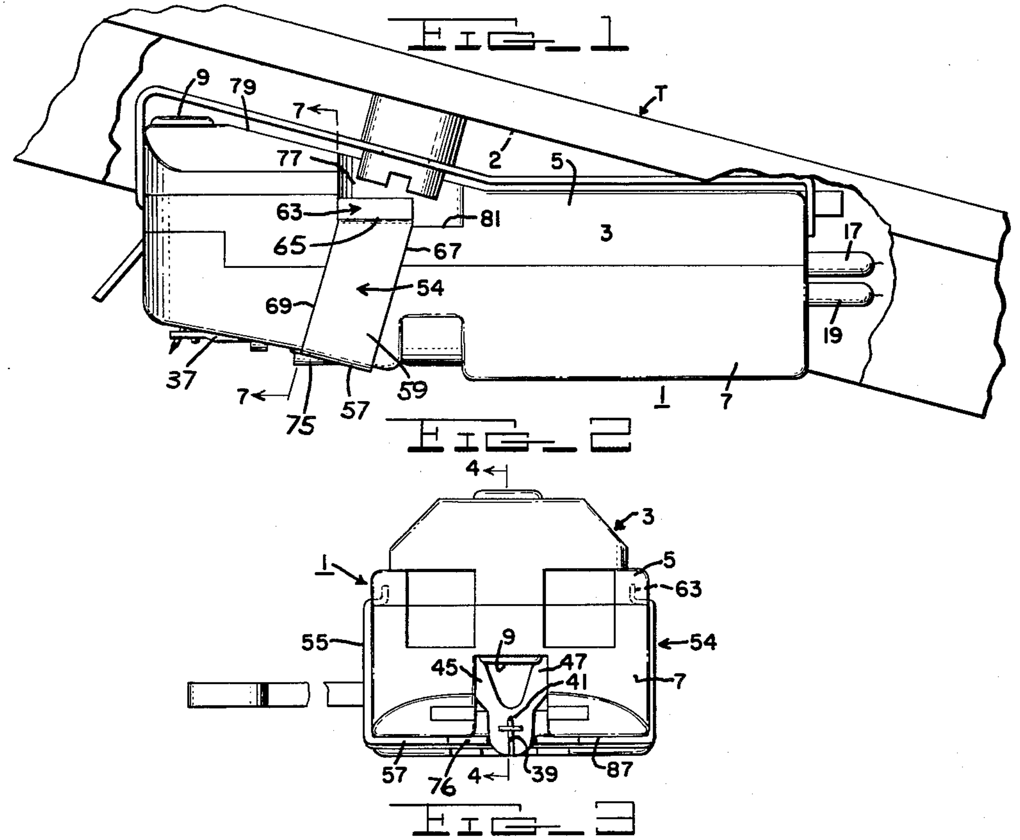
FIG. 1 is a side view of an improved phonograph cartridge embodying my invention, the cartridge being shown mounted on the free end of a fragmentarily illustrated tone arm.
FIG. 2 is a front view of the cartridge shown in FIG. 1.
Figure 3:
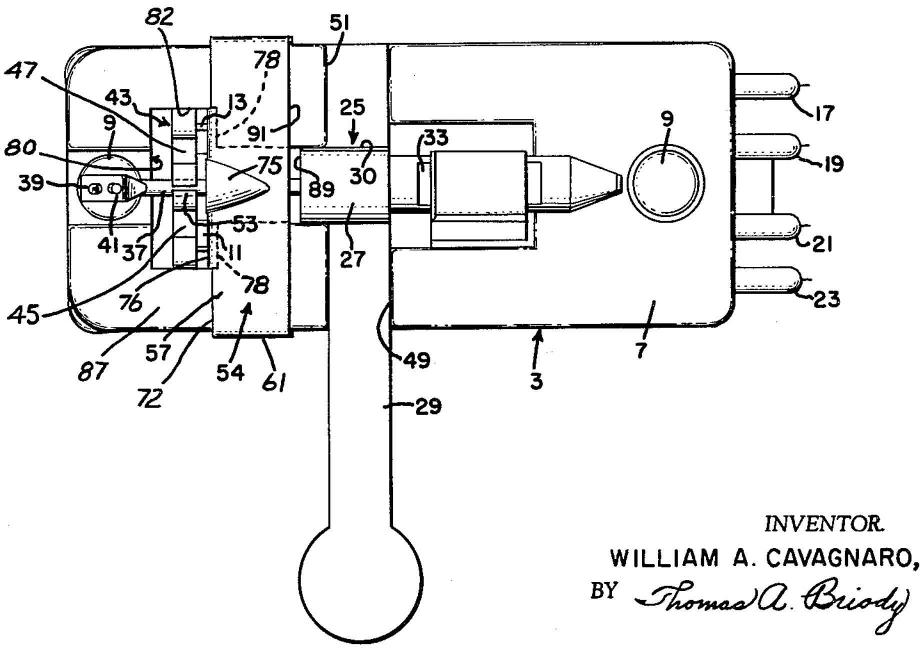
FIG. 3 is a bottom view of the cartridge shown in FIG. 1.
Figure 4:
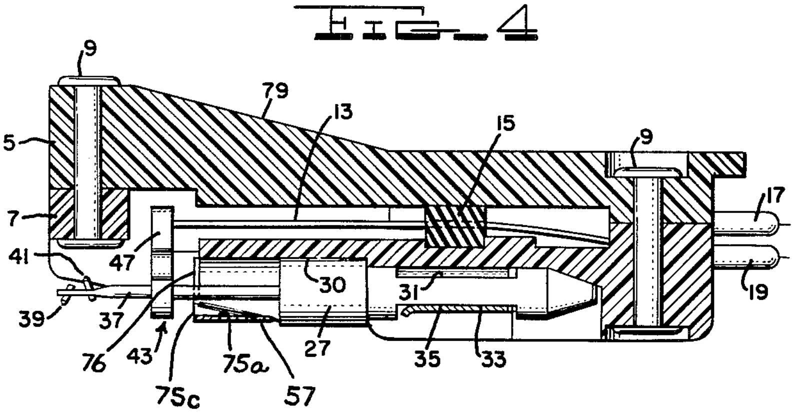
FIG. 4 is a cross-sectional view taken generally on the line 4—4 of FIG. 2.
Figure 7:
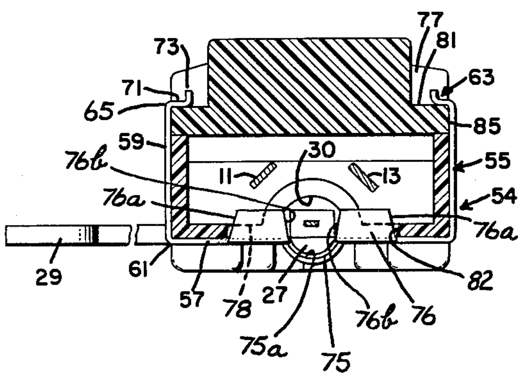
FIG. 7 is a cross-sectional view taken generally along the lines 7—7 of FIG. 1.

Referring first to FIGS. 1 and 2, there is illustrated a ceramic stereo pickup cartridge 1 embodying one form of my invention. The cartridge 1 is suitably mounted within the recessed underside 2 of tone arm T, and comprises a housing 3 which may be composed of an upper part 5 and a lower part 7 attached together by means of rivets 9. The interior of the housing 3 is partially hollow (as shown in FIGS. 3, 4 and 7) and contains a pair of elongated ceramic transducer elements 11 and 13. The transducer elements 11 and 13 are anchored to the housing 3 at the rear ends thereof by suitable means such as resilient blocks 15 (FIG. 4), and are arranged mutually parallel, with the sides thereof inclined oppositely at 45 degree angles (relative to the horizontal, viewing FIG. 7). Th elements 11 and 13 preferably are in the shape of flat bars, as shown in FIG. 7, and are provided with metallic electrodes (not shown) deposited or attached to their flat side surfaces. Suitable connecting wires (not shown) extend from these electrodes to terminal pins 17, 19, 21 and 23 at the rear of the cartridge housing 3.

A stylus assembly 25 comprises a barrel member 27 seated just within the underside of the housing 3 (FIGS. 3 and 6), and adapted to rotate 180 degrees about an axis parallel to the general axis of the housing 3. The barrel 27 is manually rotatable by means of a lower arm 29 which extends laterally therefrom and is long enough to extend beyond the sides of the housing 3. To facilitate the seating of the barrel member 27 against the underside of the cartridge housing 3, the housing 3 is provided with a curved seating region 30 (FIGS. 3 and 7) into which the barrel member 27 fits for rotation with respect to the housing 3. The barrel member 27 is flattened at opposite sides thereof as indicated at 31 and 33 (FIG. 4), and a spring clip 35 is arranged to ride against the barrel member 27 so as to engage against the flattened portions 31, 33 alternatively when the barrel is at the two extremes of its 180 degree rotation, as determined by which side of the housing 11 the arm 29 extends from. An end of the clip 35 is attached to the housing 3, by screws, or by fitting into a slot in the housing, or by other suitable means.

An elongated drive rod or tube 37 is concentric with, carried by, and extends axially forwardly of, the barrel 27, as shown in FIG. 4. The front end of the drive rod 37 is provided with two styli 39 and 41, arranged on opposite sides of the drive rod 37 and extending laterally therefrom, so that when the barrel 27 is in one of its two extreme rotary positions, one of the styli 39 will extend downwardly in record playing position, and when the barrel 27 is in its other extreme rotary position, the other stylus 41 will extend downwardly in record playing position. A convenient way to attach the styli 39, 41 to the drive rod 37 is to flatten the front end of the drive rod 37, as shown, and drill holes at suitable angles into the flattened front end of the drive rod, into which the styli 39, 41 may be inserted and held by means of an adhesive or cement.

A V-shaped coupler 43, which may be made of suitable resilient material, connects the drive rod 37 to the two transducer elements 11, 13, as shown in exemplary fashion for element 13 in FIG. 4, by means of the coupler legs 45, 47 (FIG. 2).

The curved barrel-seating region 30, and the barrel 27, are located in a recess 48 provided in the underside of housing 3, and this recess 48 includes a pair of aligned slots 49, 51 (FIG. 3) which are slightly wider than the width of the lever arm 29. The slots 49, 51 open downwardly and laterally from the curved seating region 30 for barrel 27, and are formed in the housing 3 so that the lever arm 29 enters the slots respectively at the two extreme rotatable positions, which are angularly spaced apart by 180 degrees. Thus, the slots 49, 51 establish the rotational limits of the lever arm 29. In addition, since the slots 49, 51 are only slightly wider than the width of the lever arm 29, when the lever arm 29 is in either slot, it properly positions the barrel 27 and the entire stylus assembly 25 longitudinally with respect to the cartridge housing.

Figure 6:
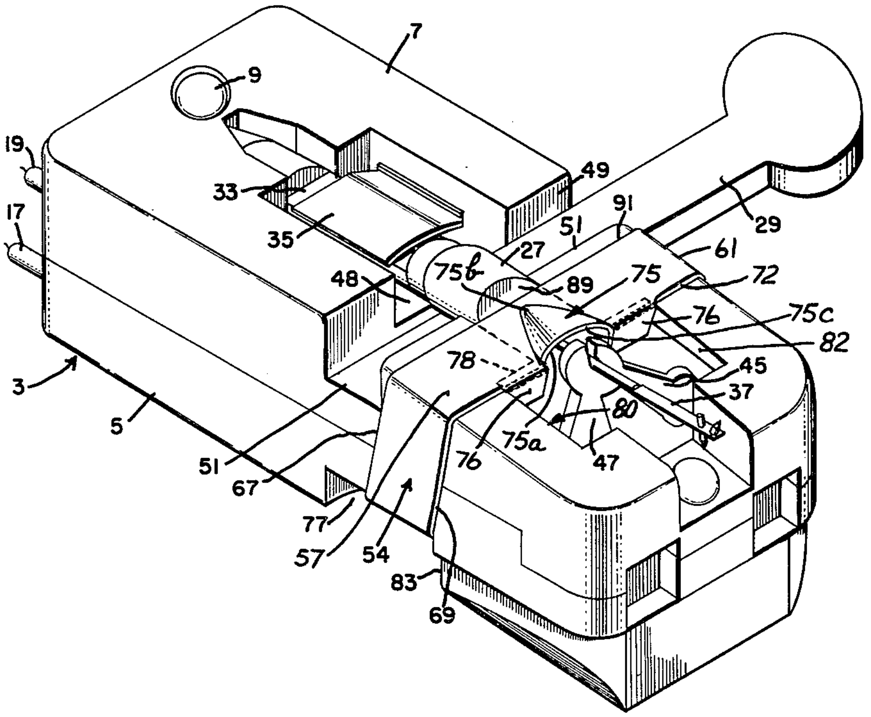
FIG. 6 is a perspective view of the phonograph pickup cartridge of FIG. 1.

Turning now to the stylus captivating arrangement of the present invention, attention is first directed to FIGS. 1, 3 and 6. As shown therein, a substantially U-shaped clip 54 is in cooperative engagement with housing 3. When the clip 54 is in cooperative engagement with cartridge housing 3, the stylus assembly 25 cannot be removed from the cartridge. To facilitate a more comprehensive understanding of the importance of clip 54, the structure, arrangement, and mode of operation of the stylus assembly 25 shall first be described for when the clip 54 is disengaged or absent from the cartridge. Thus, when the clip 54 is disengaged from the cartridge housing, the structure and arrangement of the stylus assembly 25 in the cartridge 1 is such that the stylus assembly 25 may be readily removed from and inserted into the cartridge. More particularly, to remove the lever arm 29 from the cartridge, it is first turned midway between its two operating positions so that it extends downwardly from the cartridge (i.e., through an angle of approximately 90 degrees from one of its seating slots 49, 51). The clip 35 is then not in engagement with either of the flattened portions 31, 33 of the barrel, and hence the stylus assembly can be slid forwardly by pulling the lever arm forwardly. When the forwardly moving barrel 27 engages the coupler 43, the coupler becomes bent and the drive rod 37 slips out of engagement with the coupler, via slit 53 of the coupler. As shown in FIG. 6, the slit 53 is located between the opening for the drive rod and the bottom extremity of the coupler. The stylus assembly 25 is then free from the housing. An alternative way of removing the stylus assembly 25 from the housing 3 involves tilting the stylus assembly downwardly at its front end by pulling downwardly on the lever arm 29 when enough of the barrel 27 has been removed from the spring clip, to slide the drive rod through the coupler slit 53. In this manner the stylus assembly may also be readily freed from the housing 3.

To insert the stylus assembly 25 in the cartridge with the clip 54 disengaged therefrom, the assembly 25 is slid backwardly to seat the barrel 27 in the seating region 30 under clip 35, and the drive rod is then pressed through slit 53 and into position on the coupler 43. The lever arm 29 is then turned into one of the slots 49, 51 to bring the desired one of the styli 39, 41 into operating position.

Figure 8:
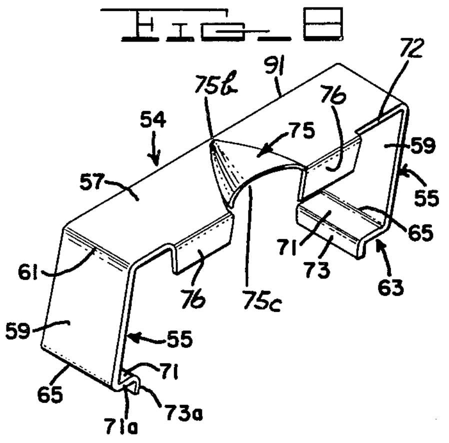
FIG. 8 is a perspective view of a stylus captivating member embodying one form of my invention.

To protect the cartridge 1 from unintentional uncoupling and undesirable removal of the stylus assembly 25, in accordance with the present invention, the aforementioned U-shaped clip 54 has been provided. (See FIG. 8.) As best shown in FIGS. 6 and 8, the clip 54 includes a pair of oppositely disposed resilient arms 55 for gripping the cartridge housing 3, the arms 55 being joined toegther by connecting portion 57, which serves as a guard for protecting and captivating the stylus assembly 25. More particularly, each of the resilient arms 55 includes an elongated flat section 59 disposed in perpendicular relationship to connecting portion 57 and joined thereto at bend 61. Near the free end of each elongated section 59 there is formed in clip 54 a substantially L-shaped shoulder 63 connected to section 59 by bend 65. As shown in FIG. 1, the bend 65 is diagonal to the longitudinal axis of elongated section 59 so that the rearward edge 67 of section 59 is longer than the forward edge 69 thereof. It will thus be seen that elongated section 59 is longer at its rear than at its front. The purpose of such an arrangement is to enable the sections 59 to conform in diagonal fashion to the sides of the housing 3 of the illustrated cartridge 1, as shall become apparent hereinafter.

As further shown in FIGS. 7 and 8, the L-shaped shoulder 63 comprises a gripping flange 71 which extends inwardly and perpendicularly from section 59 and is disposed in parallel overlying relationship to connecting portion 57. Each shoulder 63 also includes a tongue-like upright 73 extending upwardly and perpendicularly from flange 71 and disposed in generally parallel and offset relationship to its associated elongated section 59.

Turning now to an important aspect of the present invention, which concerns itself with a simplified and effective means for positively and securely positioning clip 54 on housing 3 and also protecting and positioning the drive rod 37 while allowing ample clearance for its normal usage, attention is directed to FIGS. 6–8. As shown therein, the connecting portion 57 is of generally flat construction, and it is positioned on the underside of cartridge housing 3 so that it extends transversely to the axis of drive rod 37. The connecting portion 57 of clip 54 is thus located underneath the drive rod 37 (FIG. 1), between the ends thereof (FIG. 3), and its forward lateral edge 72 (FIG. 3) is positioned in spaced proximity to the rear of coupler 43. In the center of connecting portion 57, between the bent over ends 61 thereof, there is formed a tapered arch 75. The arch 75 has a uniformly tapered and curved inner surface **75*a* (as shown in FIGS. 6 and 7), being tapered downwardly and forwardly relative to the general plane of portion 57 (viewing FIGS. 1 and 4) from apexed rear 75*b* to curved forward edge 75*c* (FIGS. 6 and 8). The purpose of the tapered arch 75, as shall become apparent hereinafter, is to provide freedom for rotatable movement and protection of drive rod 37 of the stylus assembly 25 while the clip 54 is captivating the stylus assembly 25 in the cartridge. In addition, since the curved inner surface 75*a* of the tapered arch 75 is arranged as shown in FIG. 4 (i.e., with maximally curved forward edge 75*c* closely adjacent coupler 43, and its outermost or bottom longitudinal extremity generally parallel to the normal axis of drive rod 37), the possibility of bending the drive rod is substantially reduced when the clip 54 is engaged with the cartridge housing 3**.

As further shown in FIGS. 6–8, the clip 54 includes a pair of upwardly extending tabs 76 (FIG. 7), which are located on opposite sides of arch 75 and adjacent thereto (FIG. 6). The tabs 76 are formed on the forward edge 72 of clip connecting portion 57, and they extend upwardly therefrom (FIG. 7) in a direction generally perpendicular to the plane of connecting portion 57, for cooperating engagement with associated recessed vertical walls 78 of the housing 3. More particularly, as shown in FIG. 7, the tabs 76 have a trapezoidal configuration, the outer and inner side edges **76*a* and 76*b* thereof being uniformly tapered toward each other at an included angle of approximately 30 degrees. The tapered outer side edges 76*a* of tabs 76 enhance the facility of insertion thereof into a generally rectangular recess 80 within which the coupler legs 45, 47 are located (FIG. 3). The tapered inner edges 76*b* help to limit lateral movement of drive tube 37 (i.e., movement in a direction sideways of its axis) and prevent any uncoupling of the drive rod 37 from coupler 43 when the clip 54** is engaged with the cartridge. The tapered edges *76b* also help to guide the drive tube into the tapered and curved inner surface *75a* of arch 75 if a downward thrust is exerted on the free end of the drive rod 37. In addition, in viewing FIG. 7, it will be seen that the tapered inner edges *76b* form inclined planes located on opposite sides of the drive rod 37. If a sideways or lateral external force component is exerted upon the drive rod 37 near its free end, such as for example a force directed to the right or left of the cartridge, viewing FIG. 7, the drive rod 37 will engage one or the other of these inclined planes when it is moved laterally from its normal aligned position, and is guided thereby. The guiding of the lateral movement of the drive rod 37 by the tapered inner edges *76b* allows the resilient coupler 43 to absorb substantial amounts of the lateral force component or thrust. The inner tapered edges *76b* of the tabs 76 are thus arranged to effectively control the lateral movement of drive tube 37 and help transmit lateral force components exerted upon tube 37 to coupler 43.

The walls 78 are located, as shown in FIG. 3, directly behind the coupler 43 on each side of the curved seating region 30 for the barrel member 27, and they are disposed in a plane substantially perpendicular to the axis of drive rod 37. Walls 78 thus face forwardly toward the coupled 43 and they form part of the rearward side of the rectangular recess 80. As further shown in viewing both FIGS. 3 and 6, the walls 78 of recess 80 are conterminous with oppositely disposed walls 82 thereof. The walls 82 are disposed in parallel relationship to the longitudinal axis of drive rod 37. As shown best in FIGS. 3, 4 and 7, when the clip 54 is engaged with cartridge housing 3, the rearwardly facing flat surfaces of tabs 76 engage associated walls 78 of recess 80, and the tapered outer side edges *76a* of the tabs 76 are disposed in contiguity to walls 82 of recess 80. By arranging tabs 76 of the clip 54 in such a manner, undesirable lateral movement of connecting portion 57 of the clip is precluded by the side edges *76a* of the tabs, and any rearward movement of connecting portion 57 is limited by engagement of the tabs 76 with transverse recessed walls 78 of the housing. By means of the tabs 76 and their mode of cooperation with cartridge housing 3, it will thus be seen that I have provided a positive interengagement between the clip connecting portion 57 and the housing 3.

Figure 5:
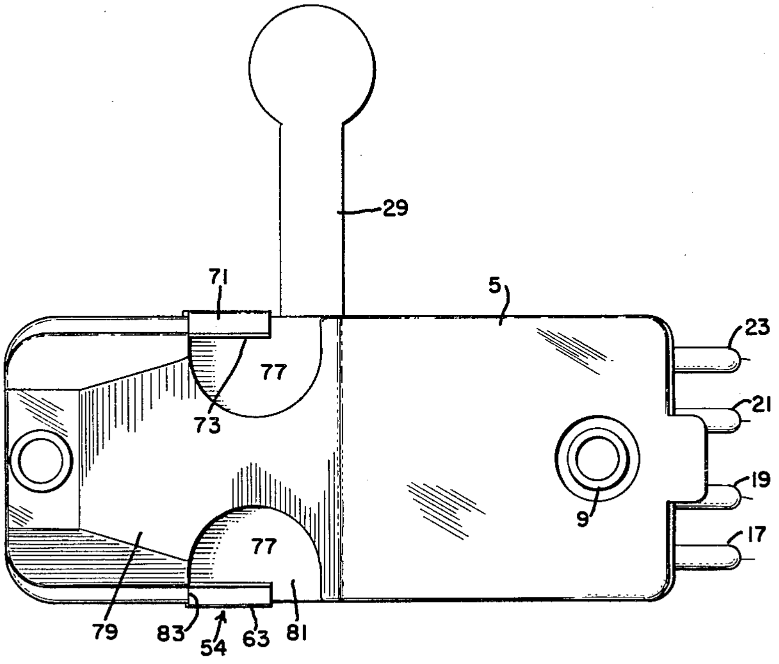
FIG. 5 is a top view of the cartridge shown in FIG. 1.

When the U-shaped clip 54 of the present invention is installed on the cartridge 1, the arms 55 are first spread further apart (i.e, sideways) from their normally upright position (FIG. 2) to the desired extent and the clip is moved upwardly from underneath the cartridge housing 3 (viewing FIG. 1) so that tabs 76 are just in front of walls 78 and underneath the coupler recess 80 (FIG. 3). The tabs 76 are then positively positioned on walls 78 and the L-shaped shoulders 63 are located adjacent the opposed stepped recesses 77 of upper inclined surface 79 of housing part 5 (see also FIG. 5). The resilient arms 55 are thereupon released and their free ends are snapped toward each other into cooperative engagement with the stepped recesses 77 of the cartridge housing.

As shown in FIGS. 1, 2, 5 and 6, the flange 71 of each resilient arm 55 then frictionally engages the bottom surface 81 of its associated recess 77, and prevents any upward or downward movement of the clip 54 relative to housing 3. The forward edges *71a* and *73a* (FIG. 8) of flange 71 and upright 73 (i.e., the edges thereof adjacent forward edge 69 of each arm 55) engage a forwardly located vertical wall 83 of recess 77 to prevent any movement of the clip toward the front or stylus end of the cartridge housing. As further shown in FIG. 7, the inner parts of the bends 65 of clip 54 are contiguous to corners formed by the bottom surface 81 and vertical outer wall 85 of the upper housing part 5. The elongated sections 59 of the clip arms 55 extend downwardly and angularly forward from their associated L-shaped shoulders 63 (FIG. 1), and are disposed in contiguity to the outer vertical walls of the cartridge housing (FIG. 2).

As further shown in FIGS. 2 and 3, when the captivating clip 54 has been snapped into cooperative engagement with the cartridge, the connecting portion 57 snugly engages the bottom surface 87 of lower housing part 7 and the longitudinal axis of the portion 57 is arranged in generally perpendicular relationship to the longitudinal axis of the cartridge housing 3. With such an arrangement of the clip 54, as shown in FIGS. 3 and 6, the forward vertical wall 89 of barrel member 27, which supports the drive rod 37, is disposed a relatively small distance behind the rearwardly facing transverse edge 91 of the connecting portion 57. The tapered arch 75 underlies the drive rod 37 between coupler 43 and wall 89 of barrel member 27.

Turning now to an explanation of the operation of the stylus captivating clip of my invention, attention is directed to FIGS. 1 and 6. When the clip 54 is resiliently engaged with the cartridge, the shoulders 63 of the clip and their seating recesses 77 of the cartridge housing, are located within the recessed underside 2 of the tone arm T, and when the lever arm 29 is rotated to an intermediate position to remove the stylus assembly 25, removal of the stylus assembly is prevented by engagement of the forward vertical wall 89 of the barrel member 27 with transverse edge 91 of the clip connecting portion 57. In addition, as shown in FIG. 1, since the shoulders 63 of clip 54 are recessed into the tone arm T they are not readily engageable, unless the cartridge 1 is first removed from the tone arm. By means of the clip 54, it will thus be seen that the stylus assembly 25 cannot be inadvertently uncoupled or undesirably removed from the cartridge 1. It will be further understood that the tabs 76 together with shoulders 63 of the clip cooperate with the cartridge housing in such a manner that any relative movement between the clip and housing is effectively precluded when the clip is engaged therewith.

In the event that removal of the stylus assembly 25 becomes desirable, it is first preferable to remove the cartridge 1 from the tone arm. All that is then required to remove the captivating clip 54 from the cartridge housing is to engage the uprights 73 of the shoulders 63 to move the resilient arms 55 apart, and then pull the clip downwardly to disengage it from the cartridge housing. When the captivating clip 54 has been removed from the cartridge, the stylus assembly 25 may be readily removed in the aforedescribed manner.

When the captivating clip 54 is cooperatively engaged with the cartridge 1, it will be understood by those skilled in the art, that it does not interfere with the operation of the cartridge in any way. By means of the positioning and arrangement of the tapered arch 75 on the connecting portion 57 of the clip, the drive rod 37 is effectively captivated without adversely interfering with the rotatable adjustment of the stylus assembly 25. In addition, the drive rod 37 is effectively guarded by the tapered arch and protected thereby.

It will now therefore be seen that the present invention provides a new and improved phonograph cartridge assembly wherein the stylus assembly is positively, yet removably captivated in very secure fashion. The stylus captivating member of my invention serves as an effective guard for preventing undesirable dislodgement of the drive rod of the stylus assembly from its coupling and also protecting the drive rod during its operative life. It will further be understood that stylus captivating members such as the one disclosed herein may be readily incorporated in a wide variety of prior art cartridges without requiring any substantial variations of the design of these cartridges. It will also be realized that cartridges employing my invention are dependable, efficient, and economical to manufacture.

While in accordance with the Patent Statutes, I have described what at present is considered to be the preferred embodiment of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. A phonograph pickup cartridge comprising a housing having a recessed bottom wall formed therein, a stylus assembly at least partially recessed into the bottom wall of said housing and removably supported therein, a member separate from said housing including a strap portion removably positioned on said housing, said member normally being disposed on said housing in spaced relationship from said stylus assembly, said strap portion underlying said stylus assembly and being arranged to captivate said stylus assembly in said housing, and means for positively interengaging said strap portion directly with the bottom wall of said housing thereby to preclude any relative movement between said strap portion of said member and said housing.

2. A phonograph pickup cartridge comprising an elongated housing having top, side walls, and a recessed bottom wall formed therein, a stylus assembly at least partially recessed into the bottom wall of said housing and removably supported therein, a clip separate from said housing, said clip including a strap portion underlying said stylus assembly and arranged on the bottom wall of said housing to captivate said stylus assembly therein, said clip normally being disposed on said housing in spaced apart relationship from said stylus assembly, means for snapping said clip into interengagement with the top wall of said housing to prevent relative movement of said clip and said housing in a direction generally transverse to the longitudinal axis of said housing, and means for positively interengaging said strap portion directly with the bottom wall of said housing thereby to prevent relative movement between said clip and said housing in a direction generally parallel to the axis of said housing.

3. A phonograph pickup cartridge comprising a housing having a recessed bottom wall formed therein, at least one transducer element within said housing, a stylus assembly at least partially recessed in the bottom wall of said housing and removably supported therein, said stylus assembly including an elongated drive rod having at least one stylus on its free end, coupling means for mechanically interconnecting said drive rod and said transducer element, and a clip separate from and resiliently cooperable with said housing, and arranged to captivate said stylus assembly in said housing without interfering with the normal operation of said stylus assembly, said clip being normally in spaced relationship from said stylus assembly and including a strap portion underlying said drive rod and disposed on the bottom wall of said housing, said strap portion including an arched portion disposed in spaced adjacency to said drive rod and underlying said drive rod thereby to protect said rod and allow operative freedom for said rod in said cartridge, and at least one tab formed on said strap portion for cooperation with the recessed bottom wall of said housing, thereby to help provide positive interengagement of said clip with said cartridge housing.

4. A phonograph pickup cartridge comprising a housing, at least one transducer element within said housing, a stylus assembly removably supported in said housing, said stylus assembly including an elongated drive rod having at least one stylus on its free end, coupling means for mechanically interconnecting said drive rod and said transducer element, and a substantially U-shaped clip separate from said housing, said clip being normally in spaced relationship from said stylus assembly and including a pair of resiliently movable arms arranged to snap into cooperative engagement with said housing and a strap connecting said arms, said strap of said clip having a portion thereof located in guarding proximity to said drive rod to captivate said stylus assembly in said housing while not in any way interfering with the normal operation of said stylus assembly, said strap also including at least one tab cooperable with said housing thereby to position said strap relative thereto.

5. The cartridge of claim 4 wherein the portion of the strap of said clip includes a tapered arch disposed in guarding proximity to said drive rod thereby to protect said drive rod.

6. A phonograph pickup cartridge comprising a housing, at least one transducer element within said housing, a stylus assembly removably supported in said housing, said stylus assembly including an elongated drive rod having at least one stylus on its free end, coupling means for mechanically interconnecting said drive rod and said transducer element, and a substantially U-shaped clip separate from and independent of said housing, said clip being normally in spaced apart relationship from said stylus assembly and including a pair of resiliently movable arms arranged to snap into cooperative engagement with said housing and a strap connecting said arms, means for positively interengaging said strap directly with the bottom wall of said housing, said strap of said clip being in cooperative engagement with said housing and arranged to positively prevent uncoupling of said drive rod from said coupling means while not in any way interfering with the normal operation of said stylus assembly, said strap also arranged to captivate said stylus assembly in said housing thereby to prevent removal of said stylus assembly from said housing.

7. A phonograph pickup cartridge comprising an elongated housing having top, side walls, and a recessed bottom wall formed therein, a stylus assembly at least partially recessed into the bottom wall of said housing and removably supported therein, a clip separate from said housing, said clip including a strap portion underlying said stylus assembly and arranged on the bottom wall of said housing to captivate said stylus assembly therein, said clip normally being disposed on said housing in spaced apart relationship from said stylus assembly, means for snapping said clip into interengagement with the top wall of said housing to prevent relative movement of said clip and said housing in a direction generally transverse to the longitudinal axis of said housing, and means for positively interengaging said strap portion with the bottom wall of said housing thereby to prevent relative movement between said clip and said housing in a direction generally parallel to the axis of said housing, said positive interengaging means for said strap portion and said housing comprising at least one tab formed on said strap portion, said tab being constructed and dimensioned to cooperate with the recessed bottom wall of said housing for preventing relative movement of said clip and housing in a direction parallel to the axis of the housing.

8. A phonograph pickup cartridge comprising a housing, at least one transducer element within said housing, a stylus assembly removably supported in said housing, said stylus assembly including on elongated drive rod having at least one stylus on its free end, coupling means for mechanically interconnecting said drive rod and said transducer element, and a substantially U-shaped clip separate from and independent of said housing, said clip being normally in spaced apart relationship from said stylus assembly and including a pair of resiliently movable arms arranged to snap into cooperative engagement with said housing and a strap connecting said arms, said strap of said clip being in cooperative engagement with said housing and arranged to positively prevent uncoupling of said drive rod from said coupling means while not in any way interfering with the normal operation of said stylus assembly, said strap also arranged to captivate said stylus assembly in said housing thereby to prevent removal of said stylus assembly from said housing, said strap of said clip including a tapered arch disposed in guarding proximity to said drive rod thereby to protect said drive rod.

9. A phonograph pickup cartridge comprising a housing, at least one transducer element within said housing, a stylus assembly removably supported in said housing, said stylus assembly including an elongated drive rod having at least one stylus on its free end, coupling means for mechanically interconnecting said drive rod and said transducer element, and a substantially U-shaped clip separate from and independent of said housing, said clip being normally in spaced apart relationship from said stylus assembly and including a pair of resiliently movable arms arranged to snap into cooperative engagement with said housing and a strap connecting said arms, said strap of said clip being in cooperative engagement with said housing and arranged to positively prevent uncoupling of said drive rod from said coupling means while not in any way interfering with the normal operation of said stylus assembly, said strap also arranged to captivate said stylus assembly in said housing thereby to prevent removal of said stylus assembly from said housing, said strap of said clip including a pair of tabs straddling said drive rod, said tabs having inclined surfaces disposed on opposite sides of said drive rod, said inclined surfaces of said tabs being engageable by said drive rod when lateral force components are exerted upon said drive rod to control lateral movement of said rod and help transmit said lateral force components to said coupling means.

References Cited by the Examiner

UNITED STATES PATENTS

| | | | |
|---|---|---|---|
| 2,565,837 | 8/1951 | Ansar | 274—37 |
| 2,594,948 | 4/1952 | Lynch | 274—37 |
| 2,699,470 | 1/1955 | Koren | 274—37 X |
| 2,752,428 | 6/1956 | Bauer | 274—37 X |
| 2,754,372 | 6/1956 | Weathers | 274—13 |
| 2,931,658 | 4/1960 | Wood | 274—37 X |
| 2,962,290 | 11/1960 | Gunter | 274—37 |
| 3,054,862 | 9/1962 | Hammond | 179—100.41 |
| 3,088,743 | 5/1963 | Di Mattia et al. | 274—37 X |

OTHER REFERENCES

German application 1,090,442, October 1960.

NORTON ANSHER, *Primary Examiner.*